(12) United States Patent
Rau et al.

(10) Patent No.: US 12,546,411 B2
(45) Date of Patent: Feb. 10, 2026

(54) SHUTOFF VALVE FOR HYDROGEN TANK SYSTEMS, COMPRESSED GAS CONTAINER, AND HYDROGEN TANK SYSTEM

(71) Applicant: Robert Bosch GmbH, Stuttgart (DE)

(72) Inventors: Andreas Rau, Stuttgart (DE); Joachim Soubari, Ettlingen (DE); Udo Schaich, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 104 days.

(21) Appl. No.: 18/566,774

(22) PCT Filed: Jun. 13, 2022

(86) PCT No.: PCT/EP2022/065936
§ 371 (c)(1),
(2) Date: Dec. 4, 2023

(87) PCT Pub. No.: WO2022/263337
PCT Pub. Date: Dec. 22, 2022

(65) Prior Publication Data
US 2024/0271717 A1 Aug. 15, 2024

(30) Foreign Application Priority Data
Jun. 14, 2021 (DE) ...................... 10 2021 205 990.2

(51) Int. Cl.
F17C 13/04 (2006.01)
F16K 27/02 (2006.01)
(Continued)

(52) U.S. Cl.
CPC ...... F16K 31/0655 (2013.01); F16K 27/0209 (2013.01); F16K 31/406 (2013.01);
(Continued)

(58) Field of Classification Search
USPC .......................... 251/30.01–30.4, 65, 129.21
See application file for complete search history.

(56) References Cited

U.S. PATENT DOCUMENTS 4,624,282 A * 11/1986 Fargo .................. F16K 31/0679
251/129.21
6,000,417 A * 12/1999 Jacobs .................. F16K 31/084
137/239
(Continued)

FOREIGN PATENT DOCUMENTS

DE 102015102782 A1 9/2015
DE 102015103782 A1 9/2016
(Continued)

OTHER PUBLICATIONS

International Search Report for PCT/EP2022/065936, Issued Sep. 16, 2022.

Primary Examiner — Matthew W Jellett
(74) Attorney, Agent, or Firm — NORTON ROSE FULBRIGHT US LLP

(57) ABSTRACT

A shutoff valve for hydrogen tank systems having at least one compressed gas container. The shutoff valve includes a main valve, and a control valve for controlling the main valve. The main valve has a reciprocating valve piston which interacts with a valve seat and delimits, at its end facing away from the valve seat, a control chamber which is connected to a storage volume of the compressed gas container via an inlet throttle and via an outlet throttle, connectable to a gas outlet depending on the switch position of the control valve. The main valve includes a solenoid using which an opening and/or holding force acting on the valve piston can be generated. A compressed gas container having the shutoff valve, and a hydrogen tank system (Continued)

comprising at least one compressed gas container and the shutoff valve, are also described.

10 Claims, 1 Drawing Sheet

(51) Int. Cl.
    *F16K 31/06*       (2006.01)
    *F16K 31/40*       (2006.01)

(52) U.S. Cl.
    CPC ...... *F17C 13/04* (2013.01); *F17C 2205/0394* (2013.01); *F17C 2270/0184* (2013.01); *Y02E 60/32* (2013.01)

(56) References Cited

U.S. PATENT DOCUMENTS

| | | | | |
|---|---|---|---|---|
| 6,199,587 | B1 * | 3/2001 | Shlomi | F16K 31/082 137/625.5 |
| 7,533,692 | B2 * | 5/2009 | Walpole | F16K 15/08 137/533.27 |
| 8,272,622 | B2 * | 9/2012 | Caldwell | H01F 7/1646 251/129.01 |
| 8,646,748 | B2 * | 2/2014 | Alberini | F02M 21/0239 251/30.02 |
| 10,208,871 | B2 * | 2/2019 | Chiapasco | F16K 31/082 |
| 2007/0290152 | A1 * | 12/2007 | Ma | F16K 31/406 251/30.01 |
| 2020/0292091 | A1 | 9/2020 | Numazaki et al. | |

FOREIGN PATENT DOCUMENTS

| | | |
|---|---|---|
| DE | 102017216556 A1 | 3/2019 |
| DE | 102018221602 A1 | 6/2020 |
| JP | 2011132863 A | 7/2011 |
| JP | 2017078486 A | 4/2017 |
| WO | 2020052834 A1 | 3/2020 |
| WO | 2020120072 A1 | 6/2020 |

* cited by examiner

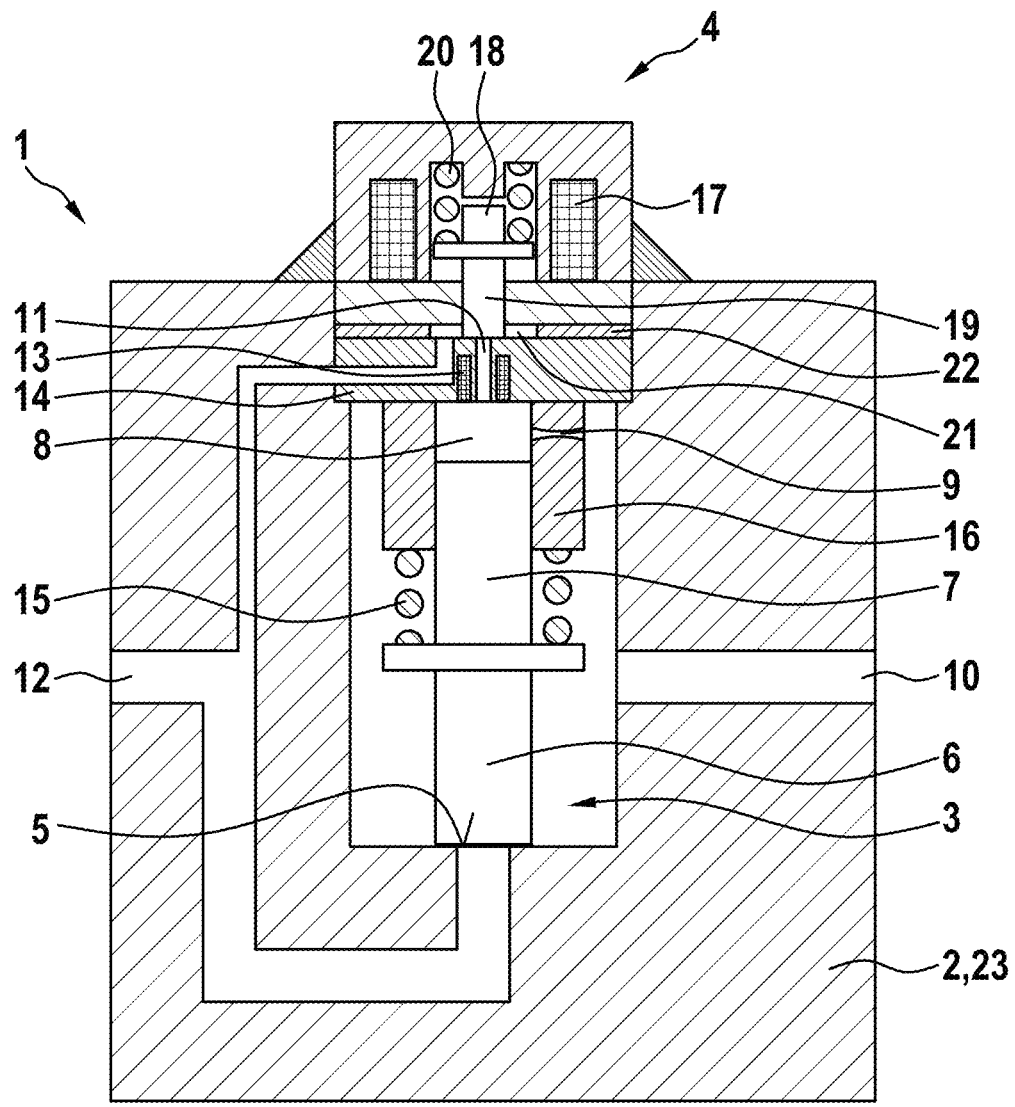

SHUTOFF VALVE FOR HYDROGEN TANK SYSTEMS, COMPRESSED GAS CONTAINER, AND HYDROGEN TANK SYSTEM

FIELD

The present invention relates to a shutoff valve for hydrogen tank systems having at least one compressed gas container. The present invention further relates to a compressed gas container for a hydrogen tank system having a shutoff valve according to the present invention, as well as a hydrogen tank system having at least one compressed gas container and a shutoff valve according to the present invention.

BACKGROUND INFORMATION

Mobile hydrogen tank systems for automobiles for converting the hydrogen in fuel cells or in hydrogen combustion engines are described in the related art. In the event of a line break or accident, the hydrogen tanks must be closed using shutoff valves to prevent uncontrolled hydrogen leakage. The shutoff valves are therefore to be designed as valves that close automatically when no current is supplied in accordance with the applicable guidelines.

The automatic closing function is typically realized with the aid of a spring acting directly or indirectly on a reciprocating valve piston of the shutoff valve in the closing direction.

The opening function is typically realized indirectly via an electromagnetically actuatable control valve. By opening the control valve, a control pressure applied to the valve piston of the main valve may be lowered, which applies a closing force to the valve piston. As the pressure drop increases, the main valve is thus able to open. The pressure drop may be realized via a comparatively small seat diameter of the control valve, such that opening the control valve requires a comparatively low force. At the same time, the seat diameter of the main valve may be increased to achieve high flow rates, which is advantageous in a hydrogen tank system. However, if the termination quantity of the control valve is fed to the valve outlet of the main valve, there is risk in the fully opened state that the pressure is the same everywhere and the shutoff valve closes due to the automatic closing function. As the load decreases, the pressure then drops again and the shutoff valve opens. This continuous opening and closing of the shutoff valve leads to increased seating region wear of the plastic or elastomeric seats typically used in the hydrogen field.

An object of the present invention is to provide a shutoff valve for hydrogen tank systems that exhibits controlled opening behavior and at the same time requires as little space as possible, in particular to enable the integration of the shutoff valve into the bottleneck of a compressed gas container in the form of a compressed gas cylinder.

To achieve the object, the shutoff valve having features of the present invention is provided. Advantageous embodiments of the present invention are disclosed herein. In addition, a compressed gas container having a shutoff valve according to the present invention and a hydrogen tank system having at least one compressed gas container and a shutoff valve according to the present invention are described.

SUMMARY

A shutoff valve according to an example embodiment of the present invention includes a main valve and a control valve for controlling the main valve. The main valve comprises a reciprocating valve piston interacting with a valve seat and bounding a control chamber at the end thereof facing away from the valve seat, which control chamber is connected to a storage volume of the compressed gas container via an inlet throttle and connectable to a gas outlet via an outlet throttle, depending on the switch position of the control valve. The main valve further comprises a solenoid coil by means of which an opening and/or holding force acting on the valve piston can be generated.

By means of the opening and/or holding force acting on the valve piston of the main valve, the disadvantages of indirect control described at the outset can be rectified. In particular, when the pressure is the same everywhere in the fully open state, the closing of the main valve can be prevented. The automatic closing function of the shutoff valve can thus be temporarily suspended by means of the solenoid coil acting on the valve piston.

Because a holding force of the solenoid coil is only required when the main valve is largely dethrottled, a comparatively small holding force is sufficient. The stroke of the valve piston also results in a minimal air gap, so that a small solenoid coil can be used. The small size of the solenoid coil allows the desired miniaturization of the shutoff valve.

In the event of a complete pressure equalization between the gas outlet of the shutoff valve and the storage pressure in the compressed gas container, no pressure reduction in the control chamber and thus also no pneumatic opening is possible. Advantageously, the solenoid force on the main valve is therefore dimensioned so large that the main valve can be magnetically opened against the closing force of a spring, enabling a defined open position of the main valve throughout the entire operation. Depending on the design objective, a combination of pneumatic and magnetic opening can also be advantageously implemented at the main valve.

According to a preferred embodiment of the present invention, the solenoid coil is arranged annularly and coaxially to the valve piston of the main valve. By means of the solenoid coil, a magnetic field can thus be established whose magnetic force acts evenly on the valve piston.

Further preferably, according to an example embodiment of the present invention, the solenoid coil is opposite the valve piston at the control chamber. That is, the solenoid coil is disposed at an axial distance from the valve piston. As a result of the stroke of the valve piston, the distance and thus the air gap between the solenoid coil and the valve piston decreases. Thus, at maximum stroke the air gap is minimal and only a small force is required to maintain the valve piston in this position.

Advantageously, the solenoid coil is integrated into a valve housing that bounds the control chamber and forms the outlet throttle. The solenoid coil may thus be disposed close to the control chamber. Further, the space around the outlet throttle may be utilized for receiving the solenoid coil. Preferably, therefore, the outlet throttle is passed through the solenoid coil. In this way, a particularly compact design arrangement is created.

According to an example embodiment of the present invention, to safely close the main valve, it is provided that the valve piston of the main valve is acted on by the spring force of a spring in the direction of the valve seat. For this purpose, the spring is preferably supported on the valve piston on one side, and on a sealing sleeve on the other side, said sleeve enclosing the end of the valve piston facing the control chamber to bound the control chamber. The control chamber is thus preferably bounded in the axial direction by the valve piston on one side and by the valve housing receiving the solenoid coil on the other side, as well as in the radial direction by the sealing sleeve. The main valve can therefore be comparatively simple in design. The sealing sleeve also allows, in a simple manner, for the compensation of manufacturing and/or assembly-related tolerances, in particular of axial offset errors.

The inlet throttle, via which the control chamber is connected to a storage volume of the compressed gas container, equalizes the volume increase of the control chamber caused by the closing movement of the valve piston and thus ensures safe closing behavior of the main valve. To reduce the number of parts, the inlet throttle may be formed by a guide gap by means of which the valve piston of the main valve is guided. To lower the precision requirements for the guide, a sealing element may be arranged in the guide region. In this case, the inlet throttle is implemented separately by a fluidic connection, in particular a throttle bore.

According to an example embodiment of the present invention, the control valve is advantageously electromagnetically actuatable and comprises an annular solenoid coil for acting on a solenoid armature coupled to a valve element of the control valve or implementing a valve element. If the solenoid armature and the valve element implement separate components that are only coupled, different materials may be used to implement the components. Thus, the optimal material can be selected according to the respective function. If the solenoid armature simultaneously implements the valve element, the number of components can be reduced and thus the configuration of the control valve can be simplified.

Similarly, the valve piston of the main valve may also be implemented by or coupled to a solenoid armature in order to act on the valve piston by means of the solenoid coil associated with the valve piston.

According to an example embodiment of the present invention, to close the control valve, said valve preferably comprises a closing spring so that closing is effected by means of spring force. The closing spring is preferably axially supported on the solenoid armature of the control valve. Further preferably, the solenoid armature and the valve element, optionally coupled to the solenoid armature, is or are axially preloaded by means of the spring force of the closing spring towards a sealing seat, which is formed by the valve housing bounding the control chamber. In this way, a compact arrangement can also be created in the axial direction.

Advantageously, according to an example embodiment of the present invention, the main valve and the control valve are arranged coaxially and are separated from one another by an axial gap in which a preferably disc-shaped body of a non-magnetic material is received. The body serves to magnetically separate the solenoid circuit of the control valve from the solenoid coil received in the valve housing for generating the holding force acting on the valve piston.

Furthermore, according to an example embodiment of the present invention, a compressed gas container for a hydrogen tank system having a shutoff valve according to the present invention is provided. Because the shutoff valve has a low space requirement, it can be easily integrated in the compressed gas container. Preferably, the shutoff valve is disposed in the region of a container outlet of the compressed gas container. In the event of a line breakage or accident, the pressure gas container can then be closed using the shutoff valve so that no gas escapes uncontrollably. The region of the container outlet can in particular be in the form of a bottleneck. A container outlet shaped in this manner is particularly sturdy and thus particularly well suited as an installation location for the shutoff valve.

On the one hand, the safety requirements are met by the integration of a shutoff valve according to the present invention in a compressed gas container, because said valve closes automatically. On the other hand, large hydrogen flow rates are enabled via the valve seat of the main valve, as this is indirectly controlled by means of an electromagnetically actuated control valve. The provided further solenoid coil can additionally generate a holding force that prevents an undesirable closing of the shutoff valve, particularly in the fully opened state. Since only a low holding force is required, a small size solenoid coil may be employed, which facilitates a miniaturized design of the shutoff valve.

In addition, according to an example embodiment of the present invention, a hydrogen tank system having at least one compressed gas container and a shutoff valve according to the present invention for shutting off the compressed gas container are proposed. Advantageously, the hydrogen tank system comprises a plurality of compressed gas containers of the same type, each of which is fitted with a shutoff valve according to the present invention. The compressed gas containers may thus be shut off independently of one another and replaced as needed.

A preferred embodiment of the present invention is explained in further detail below with reference to the FIGURE.

BRIEF DESCRIPTION OF THE DRAWING

The sole FIGURE shows a schematic longitudinal section through a shutoff valve according to the present invention in the closed position.

DETAILED DESCRIPTION OF EXAMPLE EMBODIMENTS

The shutoff valve 1 for a compressed gas container 2 shown in the FIGURE has a main valve 3 and a control valve 4. The control valve 4 is electromagnetically actuatable.

The main valve 3 comprises a reciprocating valve piston 6 interacting with a valve seat 5. The end 7 of the valve piston 6 facing away from the valve seat 5 is received in a sealing sleeve 16, which together with the valve piston 6 and a valve housing 14 bounds a control chamber 8. The sealing sleeve 16 is axially pretensioned against the valve housing 14 by means of the spring force of a spring 15. At the same time, the spring force of the spring 15 pushes the valve piston 6 against the valve seat 5.

To open the main valve 3, the control valve 4 must first be opened. To this end, a solenoid coil 17 is supplied with current so that a magnetic field is built up, the magnetic force of which acts on a reciprocating solenoid armature 18 coupled to a valve element 19 of the control valve 4. The motion of the solenoid armature 18 thus opens the control valve 4. With the control valve 4 open, gas flows out of the control chamber 8 via an outlet throttle 11 formed in the valve housing 14, such that the pressure in the control chamber 8 drops and the forces acting on the valve piston 6 allow the main valve 3 to open. Gas then flows from a storage volume 10 of the compressed gas container 2 in a gas outlet 12 via the valve seat 5. Since the termination quantity of the control valve 4 is also fed into the gas outlet 12, the same pressure sets in everywhere when the shutoff valve 1 is open. That is to say, the pressure in the control chamber 8 also rises again. In order to prevent an undesirable closing of the shutoff valve 1, a further solenoid coil 13 is integrated in the valve housing 14 by means of which a holding force acting on the valve piston 6 can be produced. The solenoid coil 13 is of a small size because holding the main valve 3 open does not require a large force. This is particularly true because, when the main valve 3 is completely dethrottled, the air gap between the solenoid coil 13 and the valve piston 6 is very small.

In order to close the shutoff valve 1, the current supplied to the solenoid coil 17 of the control valve 4 is stopped, so that a closing spring 20 returns the solenoid armature 18 including the valve element 19 to the respective initial position and closes the control valve 4. When the control valve 4 is closed, gas can no longer flow out of the control chamber 8 via the outlet throttle 11, but rather gas can only flow into the control chamber 8 via an inlet throttle 9, which connects the control chamber 8 to the storage volume 10 of the compressed gas container 2, so that the pressure in the control chamber 8 rises again. The pressure imparts a closing force on the valve piston 6 of the main valve 3, which together with the spring force of the spring 15 leads to the closing of the main valve 3.

To separate the solenoid coil 13 associated with the valve piston 6 of the main valve 3 from the solenoid circuit of the control valve 4, an axial gap 21 is provided between the control valve 4 and the valve housing 14, in which a disc-shaped body 22 of a non-magnetic material is disposed.

The shutoff valve 1 shown in the FIGURE is simply constructed and requires little design space so that said valve can be integrated in the compressed gas container 2 in the region of a container outlet 23.

The invention claimed is:

1. A shutoff valve for a hydrogen tank system having at least one compressed gas container, the shutoff valve comprising:
    a main valve; and
    a control valve configured to control the main valve;
    wherein the main valve includes a reciprocating valve piston interacting with a valve seat, an end of the valve piston facing away from the valve seat bounding a control chamber connected to a storage volume of the compressed gas container via an inlet throttle and connectible to a gas outlet via an outlet throttle, depending on a switching position of the control valve, and wherein the main valve has a solenoid coil configured to generate an opening and/or holding force acting on the valve piston,
    wherein the shutoff valve is integrated into the compressed gas container in a region of a container outlet of the compressed gas container,
    wherein, in response to a line breakage or accident, the compressed gas container is closable via the shutoff valve to prevent gas escape.

2. The shutoff valve according to claim 1, wherein the solenoid is annular and is arranged coaxially to the valve piston.

3. The shutoff valve according to claim 1, wherein the solenoid is opposite the valve piston at the control chamber.

4. The shutoff valve according to claim 1, wherein the solenoid is integrated in a valve housing bounding the control chamber and forming the outlet throttle, which is passed through the solenoid.

5. The shutoff valve according to claim 1, wherein the valve piston of the main valve is acted on by a spring force of a spring towards the valve seat, the spring being supported on one side on the valve piston, and on the other side, on a sealing sleeve that surrounds the end of the valve piston to bound the control chamber.

6. The shutoff valve according to claim 1, wherein the control valve is electromagnetically actuatable and includes an annular solenoid configured to act on a solenoid armature coupled to a valve element of the control valve or implementing a valve element.

7. The shutoff valve according to claim 6, wherein the control valve includes a closing spring, which is axially supported on the solenoid armature.

8. The shutoff valve according to claim 1, wherein the main valve and the control valve are disposed coaxially and are separated from one another by an axial gap in which a disc-shaped body made of a non-magnetic material is received.

9. A compressed gas container for a hydrogen tank system, comprising
    a shutoff valve disposed in s region of a container outlet, the shutoff valve including:
    a main valve; and
    a control valve configured to control the main valve;
    wherein the main valve includes a reciprocating valve piston interacting with a valve seat, an end of the valve piston facing away from the valve seat bounding a control chamber connected to a storage volume of the compressed gas container via an inlet throttle and connectible to a gas outlet via an outlet throttle, depending on a switching position of the control valve, and wherein the main valve has a solenoid coil configured to generate an opening and/or holding force acting on the valve piston,
    wherein the shutoff valve is integrated into the compressed gas container in a region of a container outlet of the compressed gas container,
    wherein, in response to a line breakage or accident, the compressed gas container is closable via the shutoff valve to prevent gas escape.

10. A hydrogen tank system comprising at least one compressed gas container, and a shutoff valve configured to shut off the compressed gas container, the shutoff valve including:
    a main valve; and
    a control valve configured to control the main valve;
    wherein the main valve includes a reciprocating valve piston interacting with a valve seat, an end of the valve piston facing away from the valve seat bounding a control chamber connected to a storage volume of the compressed gas container via an inlet throttle and connectible to a gas outlet via an outlet throttle, depending on a switching position of the control valve, and wherein the main valve has a solenoid coil configured to generate an opening and/or holding force acting on the valve piston,
    wherein the shutoff valve is integrated into the compressed gas container in a region of a container outlet of the compressed gas container,
    wherein, in response to a line breakage or accident, the compressed gas container is closable via the shutoff valve to prevent gas escape.

* * * * *